United States Patent [19]

Fischer et al.

[11] Patent Number: 4,997,883

[45] Date of Patent: Mar. 5, 1991

[54] IMPACT RESISTANCE MODIFIER FOR POLYCARBONATE

[75] Inventors: Jens-Dieter Fischer, Darmstadt; Werner Siol, Darmstadt-Eberstadt; Manfred Munzer, Bensheim; Thomas Rhein, Stadecken-Elsheim, all of Fed. Rep. of Germany

[73] Assignee: Rohm Gmbh Chemische Fabrik, Darmstadt, Fed. Rep. of Germany

[21] Appl. No.: 305,780

[22] Filed: Feb. 3, 1989

[30] Foreign Application Priority Data

Feb. 5, 1988 [DE] Fed. Rep. of Germany ....... 3803405

[51] Int. Cl.$^5$ ................................................ C08L 69/00
[52] U.S. Cl. ....................................... 525/67; 525/296; 525/309; 525/310
[58] Field of Search ........................................ 525/67

[56] References Cited

U.S. PATENT DOCUMENTS

| 4,749,749 | 6/1988 | Munzer | 525/148 |
| 4,906,696 | 3/1990 | Fischer | 525/148 |
| 4,906,699 | 3/1990 | Siol | 525/67 |

FOREIGN PATENT DOCUMENTS

| 0036127 | 3/1981 | European Pat. Off. . | |
| 0144213 | 6/1985 | European Pat. Off. . | |
| 0260558 | 9/1987 | European Pat. Off. . | |
| 2653143 | 5/1978 | Fed. Rep. of Germany . | |
| 2653145 | 5/1978 | Fed. Rep. of Germany . | |
| 3118526 | 12/1982 | Fed. Rep. of Germany . | |
| 3245292 | 6/1984 | Fed. Rep. of Germany . | |
| 004552 | 1/1977 | Japan | 525/67 |
| 1543146 | 3/1979 | United Kingdom . | |

OTHER PUBLICATIONS

Derwent Abstract of J62004711.

*Primary Examiner*—John C. Bleutge
*Assistant Examiner*—David Buttner
*Attorney, Agent, or Firm*—Oblon, Spivak, McClelland, Maier & Neustadt

[57] ABSTRACT

An impact resistance modifier for polycarbonate, which is a copolymer, comprising an elastomer and a methyl methacrylate copolymer, which are bonded covalently. The methyl methacrylate copolymer is one that is compatible by itself with polycarbonate resin due to specific comonomers. Such comonomers are aromatic (meth)acrylic esters and (meth)acrylamides, cycloalkyl(meth)acrylamides and cycloalkylmaleimides. Thermoplastic molding compounds comprising polycarbonate and the new impact resistance modifier exhibit excellent impact resistance.

5 Claims, 1 Drawing Sheet

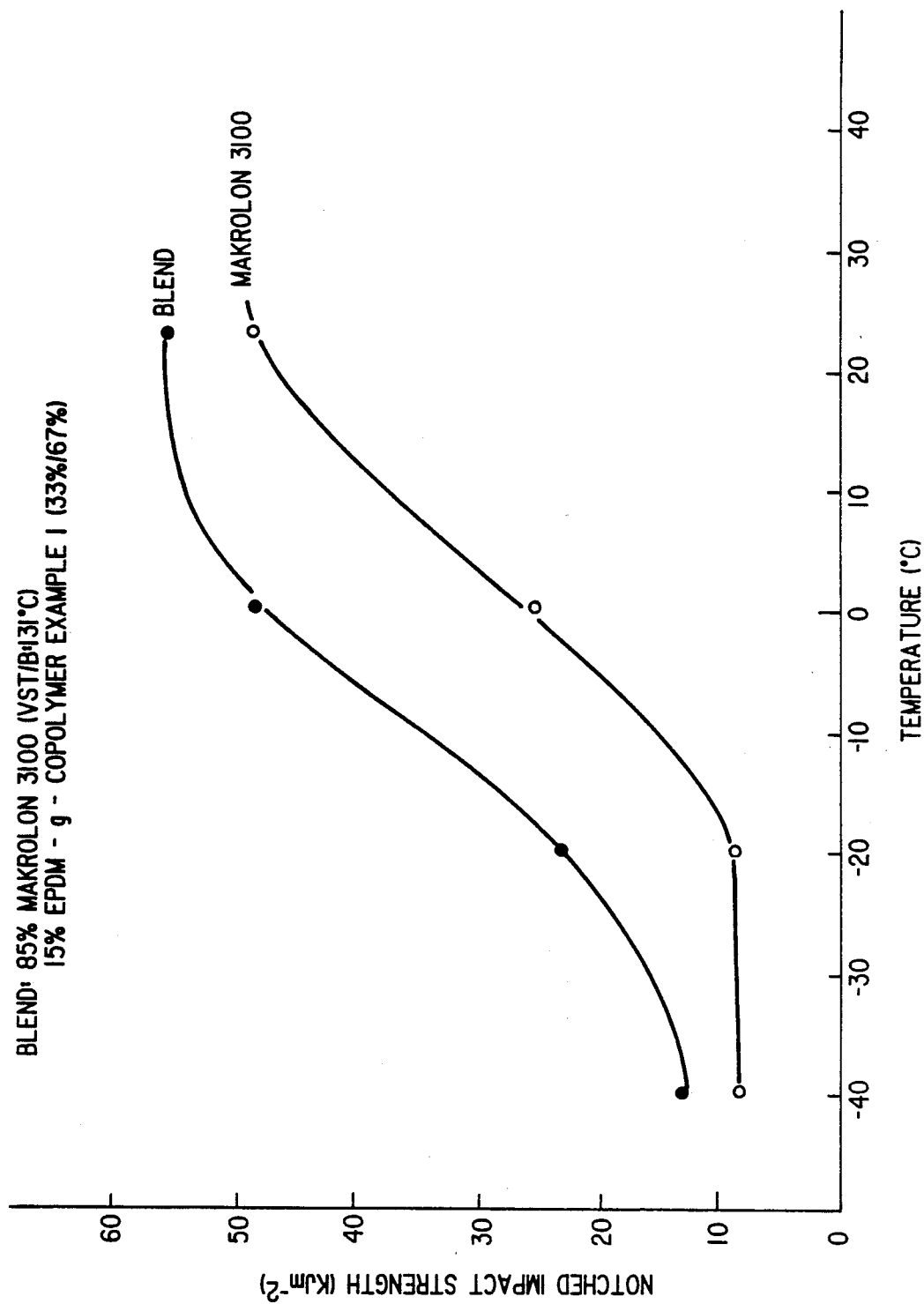

IMPACT RESISTANCE MODIFIER FOR POLYCARBONATE

BACKGROUND OF THE INVENTION

1. Field of the Invention:

The invention relates to polymers for the impact resistance modification of aromatic polycarbonates and thermoplastic molding compounds containing an aromatic polycarbonate and the impact resistance modifier.

2. Discussion of the Background:

Of the materials used to manufacture moulded plastic articles, thermoplastics are particularly important, especially thermoplastics that clearly exhibit heat resistance above 100° C. Thermoplastics having a relatively high heat resistance include polycarbonates, which are usually polycondensates based on bisphenol A. The polycarbonate based on tetramethyl bisphenol A, which in turn is a condensation product of 2,6-dimethylphenol and acetone, is characterized by a glass transition temperature that is approximately 50° C. higher than the "normal" bisphenol A polycarbonate. Its Vicat B softening temperature is 198° C. and yet it is still thermoplastically processible.

However, for many of the desirable applications of plastics, e.g., in the construction of automobiles and vehicles, the polycarbonate properties must be improved. In the case of plastics that are becoming more important as a modern construction material, the strength upon impact stress is an important property. One measure for the strength of a plastic is the value of the notched impact strength that can be experimentally determined according to DIN 53 453 and which gives information about how a polymeric material absorbs and transforms sudden mechanical stresses.

A problem which has existed for a long time in engineering, is to transform relatively brittle plastics into industrially usable products with improved impact strength. One method of improving the strength of thermoplastics, even polycarbonates, is to improve their rubber elasticity, as reported by D. Neuray and K.H. Ott in Applied Macromol. Chem., Vol. 98, pp. 213–224 (1981). It is also stressed in this reference that rubber segments must be anchored in or "coupled" to the thermoplastic matrix, since otherwise no improvement in strength is achieved even when the elastomer content is increased. The anchoring of elastomers is achieved, for example, by means of grafting the rubbers onto polymers containing monomers that by themselves can be polymerized to thermoplastic materials.

The improvement of the impact strength of the polycarbonate by means of the addition of graft elastomers is often described. Thus DE-OS 26 53 143 or the DE-OS 26 53 145 recommend graft polymers of styrene and/or methyl methacrylate and/or (meth)acrylonitrile on diene or EPDM rubber for the preparation of thermoplastic molding compounds with polycarbonate. DE-OS 32 45 292 describes a thermoplastic molding compound comprising polycarbonate and a copolymer that comprises a polymer with a multilayered construction, whereby the core is acrylic rubber and over which a graft sheath comprising in particular (α-methyl)-styrene/acrylonitrile/methyl methacrylate is applied. The polymer compound also contains an additional, separately prepared hard component, prepared from the monomers styrene, α-methyl styrene, acrylonitrile, methyl methacrylate, maleic acid anhydride and/or acrylic acid.

The European patent application 0 036 127 describes polycarbonates with improved impact strength in the form of a mixture of a polycarbonate resin and an acrylic rubber exhibiting interpolymer bonding, which contains diallyl maleate as the grafting monomer and methyl methacrylate as the monomer of the second polymer phase.

A polymer blend containing polycarbonate and an EPDM-g-methyl methacrylate/N-phenylmaleimide graft polymer is described in the European patent application 0 144 213.

Also from the European patent application 0 260 558 thermoplastic compounds containing polycarbonates and thermoplastic graft polymers based on silicone rubber with good toughness have become known, whereby the silicone rubbers for improved grafting onto resinforming monomers are provided with an intermediate sheath made of cross-linked acrylic rubber.

The DE-OS 31 18 526 describes thermoplastic molding compounds containing polyalkylene terephthalate, polycarbonate, and a graft polymer, whereby the graft polymer can also be an acrylic rubber core, constructed with aromatic esters such as benzylacrylate and phenylethylacrylate.

Compatible polymer mixtures containing polycarbonate and thermoplastically deformable methyl methacrylate copolymers are known. According to the German patent application P 36 32 946.0, the compatibility of the polymethyl methacrylate is induced with N-cyclocompound substituted (meth)acrylamides or, according to the German patent application 37 09 562.5, with N-cyclohexyl- or N-phenyl-substituted maleimides or, according to the German application P37 19 239.6, with cycloaliphatic or aromatic (meth)acrylic esters, as the comonomers.

In spite of the numerous attempts to improve the impact strength of polycarbonates, new and superior impact strength modified polycarbonates remain an important scientific and industrial objective.

SUMMARY OF THE INVENTION

Accordingly, one object of the present invention is to provide polycarbonates having improved impact strength or notch impact strength. The improvement of the notch impact strength for low temperatures, i.e., for the temperature range from 0 to approximately −50° C., is particularly important due to the application of impact resistance modified polycarbonate blends, for example as vehicle parts, and the improvement should be made possible without any significant negative effect on the other properties of the polycarbonate.

These and other objects which will become apparent from the following specification have been achieved by the present impact resistance modifier for use in a thermoplastic aromatic polycarbonate resin. The impact resistance modifier comprises a two phase copolymer having a hard phase compatible with the polycarbonate and a rubber or elastomeric phase for impact resistance. The two phase copolymer comprises (A) 20–90 wt.% of an elastomeric polymer component having a glass temperature $Tg \leq 10°$ C., and (B) 80–10 wt.% of a polycarbonate compatible methyl methacrylate copolymer component which is covalently bonded to the elastomeric polymer component. The methyl methacrylate copolymer component is a statistical copolymer having a glass temperature Tg greater than or equal to 30° C. and has the formula

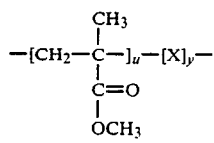

where X is the group

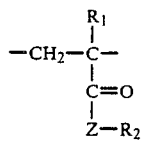

where Z is —O— or —NH—, $R_1$ is hydrogen or methyl, $R_2$ is —$(CH_2)_n$—W— and n equals 0–5, and where when Z is —O—, W is a $C_{6-12}$ aryl group or an alkyl substituted $C_{6-12}$ aryl group, and when Z is —NH—, W is an alkyl substituted $C_{6-12}$ aryl group or an alkyl substituted $C_{5-9}$ cycloalkyl group. In the formula above for the methyl methacrylate copolymer, $u+y=100$ wt.%, u is between 10–98 wt.% and y is between 90–2 wt.% of the methacrylate copolymer. The methacrylate copolymer may contain 0–15 wt.% of a copolymerizable $\alpha,\beta$-unsaturated comonomer.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

FIG. 1 illustrates a graph of temperature vs. notched impact strength for the impact resistance modified polycarbonate of Example 2.

DETAILED DESCRIPTION OF THE PREFERRED EMBODIMENTS

Surprisingly it has been found that when methyl methacrylate copolymers that are quite compatible with polycarbonate and known from the aforementioned prior art, are combined as the hard phase with a rubber elastomer phase which is grafted onto the methacrylate copolymer, excellent impact resistance modifiers for polycarbonate are produced. Thus impact resistance modifiers have been found with which the toughness phase, i.e., the rubber or elastomer phase is anchored in the polycarbonate by means of copolymers that are very compatible with the coherent polycarbonate phase. The methyl methacrylate copolymers which function as the anchor can be attached as graft branches or as shells to the rubber or elastomer phase.

The amount of the impact resistance modifier of the invention, which comprises polymer components (A) and (B), added to the thermoplastic aromatic polycarbonate to be modified ranges from 5 to 70% by weight, preferably 5 to 50% by weight, more preferably 10–40% by weight, based on the impact resistance modified thermoplastic molding compound.

To prepare the impact resistance modifier of the invention, polymers having a glass temperature Tg less than or equal to 10° C, preferably less than or equal to $-10°$ C., are added as the elastomer phase (A). Elastomer phase (A) generally includes all such polymers that are usually combined under the term "rubber". The polymers of the component (A) may be cross-linked. Their glass temperature Tg may be determined according to Edith. A. Turi "Thermal Characterization of Polymeric Materials", p. 169 ff., Academic Press, N.Y., 1981. Preferably the polymers for the elastomer phase (A) are selected from the group comprising polyolefins, polydienes, ethylene-vinyl acetate copolymers, polyacrylates, and polysiloxanes (see also Ullmanns Encyklopadie der technischen Chemie, 4th edition, vol. 13, pages 595 to 635, Verlag Chemie, 1977). The preparation of these rubbers and elastomers and their properties such as solubilities and viscosities, as well as their molecular weights Mw, are listed in the aforementioned citation.

Preferred as the elastomer phase (A) are terpolymers comprising ethylene, propylene, and a diene, the so-called EPDM rubbers and acrylate rubbers.

Preferably the polyacrylate rubbers are prepared through polymerization in an aqueous emulsion, partially also in suspension according to the relevant known methods (Ullmanns Encyklopadie der technischen Chemie, 4th edition, Vol. 19, pages 125 to 137, Verlag Chemie, 1980).

The methyl methacrylate copolymer (B), which is bonded to polymer (A), contains groups X which are components of the methacrylate copolymer (B). Among others, they are described as the comonomers for methyl methacrylate in the aforementioned German patent applications P 36 32 946.0, 37 09 562.5 and 37 19 239.6. In a preferred embodiment $R_1$ stands for $CH_3$, i.e., preferably the group X is derived from methacrylic acid. Examples of X are phenyl methacrylate, benzyl methacrylate, phenylethyl methacrylate, phenylethyl acrylate, N-phenyl methacrylamide, N-cyclohexyl acrylamide, N-2-methylcyclohexyl methacrylamide and, if desired, also N-cyclohexyl maleimide and N-4-methylcyclohexyl maleimide.

The quantities of methyl methacrylate and X in polymer B), i.e., the proportions of u and y, are respectively, between 10 and 98% by weight for u, preferably between 50 to 95% by weight, and between 2 to 90% by weight, preferably between 5 to 50% by weight for y, where $u+y=100$% by weight.

The methyl methacrylate copolymers (B) are polymers having glass temperatures Tg greater than or equal to 30° C.

The copolymer (B) may contain other $\alpha,\beta$-unsaturated monomers in quantities from 0 to 15% by weight, preferably in quantities from 0.5 to 5% by weight, based on (B). These other $\alpha,\beta$-unsaturated compounds include styrene, $\alpha$-methylstyrene, acrylic acid, methacrylic acid, $C_1$ to $C_6$ alkyl esters of the acrylic acid, such as methyl acrylate and other alkyl esters ($C_2$ to $C_6$) of methacrylic acid, such as ethyl methacrylate. Even the addition of compounds having polymerizable double bonds, i.e., crosslinkers, is possible and may be expedient. The impact resistance modifier can be prepared with reference to known processes as follows.

The polymer component (A) is used preferably in the form of a solution in a solvent that is suitable for further processing, for example in a solvent that is suitable for the radical polymerization of the monomers of polymer component (B). (H. Rauch-Puntigam, Th. Volker, Acryl-und Methacrylverbindungen, SpringerVerlag, Heidelberg, 1967; J. Brandup, E.H. Immergut, Polymer Handbook, Vol. II pp. 144–148, John Wiley, 1975). In this case the tendency of the solvents to undergo transition reactions is to be taken into consideration.

Examples include esters such as butyl acetate, ethyl acetate, hydrocarbons such as toluene, and ketones such as acetone. Generally one starts from solutions containing approximately 15 to 50% by weight of the polymer component A to which the monomers for polymer component (B) and polymerization aids are added, for example, drop-wise. As a rule the polymerization is conducted at a temperature, ranging, for example, from 80° C. to 140° C. The conventional initiators such as peroxides or azo compounds can be used as initiators (see H. Rauch-Puntigam, Th. Volker Acryl- und Methacrylverbindungen, loc. cit.). With solvents that boil at lower temperatures, dibenzoyl peroxide can be used, for example, whereas with solvents that boil at higher temperatures, tert-butyl compounds such as tert. butyl peroctanoate are suitable for use.

When grafting EPDM, the polymerization of the monomers of polymer component (B) can be conducted with butyl acetate as the solvent first at approximately 120° C. and then subsequently at approximately 80° C.; while adding more methyl methacrylate, crosslinker and initiator. The polymerization can be conducted in the presence of regulators, e.g., mercaptans.

The elastomeric polymer component is covalently bonded or linked to the methyl methacrylate copolymer component during the graft polymerization. Preferably, more than about 5% by weight of the elastomeric polymer component is covalently bonded to the methyl methacrylate copolymer.

Preferably the impact resistance modifier is obtained by precipitation from solution, for example, with methanol as the precipitating agent. In preparing the modifier by means of emulsion polymerization, the modifier is obtained preferably by squeezing and so draining the emulsion polymer with the aid of an extruder.

IMPACT RESISTANCE MODIFICATION OF POLYCARBONATE

The plastics to be modified are polycarbonates, primarily thermoplastically deformable, aromatic polycarbonates, i.e., polycarbonates that are prepared with bisphenols such as 2,2-bis-(3,5-dimethyl-4-hydroxyphenyl)-propane, but primarily with 2,2-bis-(4-hydroxyphenyl)-propane, i.e., with the compound known as bisphenol A. Polycarbonates of bisphenol A are, for example, commercial products such as Makrolon ®. The thermoplastic, aromatic polycarbonates have average molecular weights of at least about 10,000, preferably between about 20,000 and about 200,000. This corresponds to a relative viscosity ranging from about 1.1 to 1.5, measured at a 0.5% by weight solution in methylene chloride at 25° C.

The polycarbonates to be modified with the impact resistance modifier of the invention can be blended in the known manner by means of mechanical mixing, for example on a roller kneader or in the extruder (see Ullmanns Encyklopadie der technischen Chemie, 4th edition, Vol. 15, pp. 281–285). Generally the addition of the impact resistance modifier of the invention to the thermoplastic aromatic polycarbonate to be modified, amounts to 5 to 70% by weight, preferably 5 to 50% by weight, particularly 10–40% by weight, based on the impact resistance modified thermoplastic molding compound. At the same time the goal is to produce properties that in their entirety are as optimal as possible.

The impact resistance modifiers of the invention are clearly superior to the conventional agents that are essentially combinations of styrene-methyl methacrylate-acrylonitrile copolymers and an elastomeric phase, due to the greater compatibility of the (B) phase of the present modifier with the polycarbonate and thus better anchoring in the entire system, under stress, in particular low temperature stress.

The extreme suitability of the impact resistance modifier of the invention is demonstrated by the following examples. The impact strength (SZ) and the notch impact strength (KSZ) were determined according to DIN 53 453. The Vicat softening temperature was determined according to DIN 53 460 (VST/B).

Other features of the invention will become apparent during the course of the following descriptions of exemplary embodiments which are given for illustration of the invention and are not intended to be limiting thereof.

EXAMPLES

Example 1: Preparation of the impact resistance modifier for polycarbonate with EPDM as the elastomeric phase While stirring, 200 g of EPDM (EPSYN ® 55) was dissolved in butyl acetate within 75 min. to a 30% solution. Then while stirring, a mixture comprising:

356 g methyl methacrylate
40 g phenyl methacrylate
4 g methyl acrylate
6 g tert-butyl peroctanoate
600 g butyl acetate was added over another 2 hours at 120° C. After approximately 30 minutes of cooling to 80° C. while stirring, a mixture comprising 10 g triallyl cyanurate, 10 g methyl methacrylate and 4 g tert-butylperoctanoate was added, stirred for 2 hours at 80° C. and thereafter stirred for 2 hours at 90° C.

Following cooling, the graft copolymer was precipitated in methanol.

The impact resistance modifier had the composition: 67% by weight of a copolymer comprising methyl methacrylate-phenyl methacrylate-methyl acrylate in a weight ratio of 89:10:1 and 33% by weight of EPDM.

Example 2: Preparation of impact resistance modified polycarbonate

15% by weight of the impact resistance modifier, described in Example 1, was blended with 85% by weight of Makrolon ® 3100 and injection molded. The result was a glossy, opaque polymer mixture with excellent impact strength, notch impact strength and heat resistance (FIG. 1 and Table 1).

Example 3: Preparation of an impact resistance modifier with core-shell structure for polycarbonate 1,270 g water (distilled), 0.5 g acetic acid, 0.5 g of iron-(II)-sulfate and 125 g of a monomer emulsion A, comprising 1,460 g water (distilled), 4 g $C_{15}$–paraffin sulfonate, 1,115 g butyl acrylate and 23 g allyl methacrylate were introduced into a Witt jar provided with a heater and an agitator; and the polymerization was started at room temperature with 0.15 g diisopropyl benzene monohydroperoxide and 1.3 g sodium hydroxymethylsulfinate. Upon reaching the maximum temperature, another 2,478 g of the monomer emulsion A was added and polymerized with 1.26 g diisopropyl benzene monohydroperoxide and 0.3 g sodium hydroxymethylsulfinate (core polymer).

After the reaction had subsided, the obtained dispersion was heated to 90° C. At this temperature a monomer emulsion B, comprising 1,460 g water, 4 g C₁₅ paraffin sulfonate, 570 g methyl methacrylate, 560 g phenyl methacrylate, 12 g methyl acrylate and 6 g 2-ethylhexyl thioglycolate was added for 2 hours and polymerized in the presence of 2 g potassium peroxydisulfate (shell polymer).

Example 4

12% by weight (corresponding to 6% by weight of the butyl acrylate portion) of the impact resistance modifier, described in Example 3, was blended with 88% by weight of Makrolon ® 3100 and injection moulded (the butyl acrylate portion corresponds approximately to the EPDM portion from Example 2). The result was a glossy, opaque polymer mixture with improved low temperature notch impact strength and very good heat resistance (Table 2).

Example 5

12% by weight (corresponding to 6% by weight of the butyl acrylate portion) of the impact resistance modifier, described in Example 3, was blended with 88% by weight of Makrolon ® 1189 ("low molecular" polycarbonate) and injection moulded (the butyl acrylate portion corresponds approximately to the EPDM portion from Example 2). The resulting polymer mixture was opaque and had good surface gloss. While maintaining the very good Makrolon ® heat resistance, the notch impact strength of Makrolon ® 1189 was improved by 50% at room temperature (Table 2).

TABLE 1

Property Profile of the Mixture According to Example 2

|  |  | Blend | Makrolon ® 3100 Comparison |
|---|---|---|---|
| Impact strength (NKS) (KJm⁻²) | 23° C. | without break | without break |
| notch impact strength (NKS) (KJm⁻²) | 23° C. | 55 (hinge break) | 48 |
|  | 0° C. | 45 (hinge break) | 25 |
|  | −20° C. | 23 | 8.5 |
|  | −40° C. | 13 | 8.5 |
| Vicat softening temperature/B | (°C.) | 131 | 148 |

TABLE 2

Properties of the Blends

|  | Blend according to Example 4 | Blend according to Example 5 | Comparison example Makrolon ® 1189 |
|---|---|---|---|
| Impact strength (23° C.) (KJm⁻²) | without break | without break | without break |
| notch impact strength (23° C.) | 40.3 (hinge break) | 19.7 | 13 |
| 0° C. | 31.5 (hinge break) | 11.7 |  |
| −20° C. | 12.5 | 7.9 |  |
| −40° C. | 9.1 | 6.5 |  |
| Vicat softening temperature/B | 142 | 136 | 138 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A thermoplastic molding compound, comprising:
   (i) 95–30 wt.% of an aromatic polycarbonate; and
   (ii) 5–70 wt.% of a two-phase impact resistance modifier copolymer, comprising:
      (A) 20–90% of an elastomeric polymer component having a glass temperature Tg less than or equal to 10° C.; and
      (B) 80–10 wt.% of a polycarbonate compatible methyl methacrylate copolymer component which is covalently bonded to said elastomeric polymer, wherein said methyl methacrylate copolymer is a statistical copolymer having a glass temperature Tg greater than or equal to 30° C. and has the formula

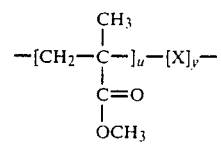

where X is the group

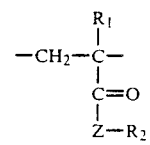

wherein Z is —O— or —NH—, $R_1$ is hydrogen or methyl, $R_2$ is —$(CH_2)_n$—W and $n=0-5$, wherein when Z is —O—, W is a phenyl group or an alkyl substituted phenyl group, and wherein when Z is —NH—, W is an alkyl substituted phenyl group or an alkyl substituted $C_{5-9}$ cycloalkyl group, wherein said methyl methacrylate copolymer component contains 0–15 wt.% copolymerizable α,β-unsaturated comonomers, u is between 10–98 wt.% and y is between 90–2 wt.% of the methyl methacrylate copolymer component.

2. The thermoplastic molding compound of claim 1, comprising 95–50 wt.% of said polycarbonate and 5–50 wt.% of said impact resistance modifier.

3. The thermoplastic molding compound of claim 1, comprising 90–60 wt.% of said aromatic polycarbonate and 10–40 wt.% of said impact resistance modifier.

4. The thermoplastic molding compound of claim 1, wherein said polycarbonate is prepared from a bivalent phenol selected from the group consisting of 2,2bis-(3,5-dimethyl-4-hydroxyphenyl)-propane and 2,2-bis-(4-hydroxyphenyl)-propane.

5. The thermoplastic molding compound of claim 1 wherein said aromatic polycarbonate has a relative viscosity from about 1.1 to 1.5 as measured at 25° C. in a 0.5 wt.% solution of methylene chloride.

* * * * *

UNITED STATES PATENT AND TRADEMARK OFFICE
CERTIFICATE OF CORRECTION

PATENT NO. : 4,997,883
DATED      : MARCH 5, 1991
INVENTOR(S) : Jens-Dieter Fischer et al It is certified that error appears in the above-identified patent and that said Letters Patent is hereby corrected as shown below:

On the title page, item [73], Assignee, change "Rohm" to --Röhm--.

Signed and Sealed this

Eighth Day of December, 1992

Attest:

DOUGLAS B. COMER

*Attesting Officer*  *Acting Commissioner of Patents and Trademarks*